May 5, 1936.  A. J. BORST, JR  2,039,386
RUBBER PRODUCTS AND METHOD OF PRODUCING THE SAME

Filed Nov. 14, 1930

Andrew J. Borst, Jr.,
Inventor.
By Emil Kunkart
Attorney.

Witness:
J.J. Oberst.

Patented May 5, 1936

2,039,386

UNITED STATES PATENT OFFICE 2,039,386

RUBBER PRODUCTS AND METHOD OF PRODUCING THE SAME

Andrew J. Borst, Jr., Buffalo, N. Y.

Application November 14, 1930, Serial No. 495,698

29 Claims. (Cl. 18—59)

My invention relates to a rubber product and the method of making the same, it being particularly adapted for use in bearings, pivotal connections of various kinds, cushions, supports, packings of various kinds, bumpers, and for many other purposes. The primary object of my invention is to provide a rubber bushing of new and novel construction particularly adapted for use in automobile shackles of the type set out in my co-pending application, Serial No. 434,369, allowed August 22, 1933.

Another object of my invention is to provide a rubber or composition product which is practically non-distortable, yet exceedingly durable under strains of various kinds, and also under friction, and which, in one of its forms, serves admirably as a bearing element requiring no lubrication.

Another object of my invention is the production of a rubber or composition product in which slender textile or other strain-resisting elements of comparatively short lengths are embedded therein under vulcanization and positioned to trend in the same course or general direction, the strain-resisting elements being preferably flattened within the rubber or rubber composition, as the case may be, without reducing the tensile strength of such cord elements, or "shreds" as they may be called.

A further object of my invention is the production of a product of the kind mentioned in which regions overlie one another to provide a unitary vulcanized structure formed of laminations, and in which the cords or shreds or other strain-resisting elements in each region trend in the same direction and may or may not cross those in another or the other regions.

A still further object is the production of a rubber or similar product under a new and novel method of manufacture enabling the product to be fashioned in various forms, shapes, and under varying constructions.

With the above and other objects to appear hereinafter, my invention consists in the novel rubber product, in the novel features of construction, and in the new and novel method of working rubber or rubber composition material to produce the advantages herein set out; the invention being particularly pointed out in the subjoined claims.

Figure 1:
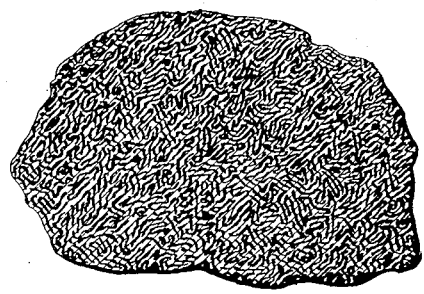
Fig. 1 is a view of bulk material, such as utilized and worked up under my improved method in conjunction with other material to provide a rubber composition or product according to the invention herein set out.

It is the general purpose of my invention to mix short lengths of strong slender elements, preferably textile material, such as cords capable of withstanding considerable tensile strain, with a body of rubber, the cords being short lengths, varying according to the purpose of use of the product, but for most small articles such cords or shreds need not exceed one inch in length, while, for larger articles they may be considerably longer, and this rubber with the cords or shreds mixed therewith I work or manipulate in any suitable manner to cause them to trend in one and the same general direction throughout the rubber body, preferably by manipulating the rubber with the cords or shreds therein into the form of flat sheets and for small articles these flat sheets are formed under considerable pressure so that the cords or shreds therein are flattened without, however, causing them to be weakened.

Where expense of the product is not taken into consideration, new or crude rubber may be mixed with short lengths of cords and may be utilized in the product as the sole rubber medium or, if desired, a rubber composition or mixture comprising new or crude rubber and reclaimed rubber in desired proportions may be used to form the rubber body of the product, the short cords being mixed with the two grades of rubber. I have, however, found that for all practical purposes, a highly serviceable product is obtained by utilizing rubber and cords embedded therein derived from tires, rubber belts, etc., and working such material into a product, such as illustrated in Fig. 1; which is, for example, produced by removing the outside rubber from old tires and the fabric lining on the inside of the tire, leaving only the cord carcass of the tire, consisting of the cords and comparatively little rubber. This carcass is chopped into small pieces in a suitable machine and worked into bulk or unitary mass formation, in which the short lengths of the cords created by chopping the carcass into small pieces are intermingled and curled, twisted, or otherwise irregularly disposed.

The cord carcass is preferably reduced to small pieces three or more inches in length and width, and the cords thereof are then pulled apart by the reclaimer, the rubber in the cords and the rubber adhering thereto being sufficient to produce the cord-contained or cord-embedded mass, which may be referred to as a rudimentary base. This bulky mass or rudimentary base with the short cords or shreds vulcanized or otherwise worked into it is a product purchasable in the open market and manufactured by reclaiming concerns generally. In the method of producing my improved rubber product I utilize this rudimentary base and mix with it new or crude rubber and reclaimed rubber. The proportions of the mass referred to, which may for convenience be termed a cord-embedded mass, and the new or crude and reclaimed rubber may vary, but for a product having long life capable of resisting strains of various kinds, and possessing the required flexibility or cushioning qualities and also being comparatively cheap, I prefer to employ fifty percent of the cord-embedded mass, twenty-five percent of new or crude rubber, and twenty-five percent of reclaimed rubber; it, of course, being understood that comparatively little rubber is contained within and between the cords of the carcass worked into the cord-embedded mass, and the cords in the mass seemingly predominate; also that in addition to being embedded within the small quantity of rubber the cords are exposed over the entire surface of the so-called cord-embedded mass prior to mixing the crude and reclaimed rubber with it.

While I have referred to utilizing the cord carcasses of tires to produce the cord-embedded mass or rudimentary base, rubber belts or old and worn out hose, etc., may also be used instead of tire carcasses, in which case the surface layers of the belt, hose, or the like are stripped from the cord carcass, and as the rubber content in the carcass of the belt, hose, or the like is substantially the same as in the carcass of a tire, the cord carcass derived from the belt may be similarly treated to produce the cord embedded mass or rudimentary base, adapted to be mixed with crude or/and reclaimed rubber.

Figure 2:
Fig. 2 is a longitudinal section through a sheet of material having the constituent parts necessary to produce my improved product, and wherein the material illustrated in Fig. 1 is utilized as a base or foundation for the same.
Figure 3:
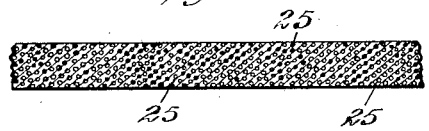
Fig. 3 is a cross section taken on line 3—3, Fig. 2.

The rudimentary base and the added rubber, crude or new, or reclaimed, or both, in desired proportions is then passed through a mill to break up the three elements or constituents so provided and roll them into sheets; and while passing these through the mill, a certain amount of a hardening substance is fed into the mill and an accelerator to assist in curing it, these being in proper proportions to the weight or bulk of the stock, and at the same time a quantity of lubricating substance, such as paraffin or the like, may be added. The stock is continuously run through the mill until all of the short cords or shreds trend in the same general direction, at which time these cords appear as shown in Figs. 2 and 3, the rubber being in the form of a sheet which, for some products, is to be further reduced. For this purpose the sheet so fashioned is passed through a calender to considerably reduce the thickness of the sheet and to break down the cords, which become flattened under the pressure of the calender rolls; and under such action, any cords or shreds which have not assumed the desired trend will be so disposed, and all cords are straightened out and flattened within the rubber sheet or layer. These cords or shreds therefore become comparatively thin and wide. The sheets can be considerably reduced in thickness and when fashioned into the form of a completed object, such as a bushing, gasket, or other article, the cords will be closely disposed and more numerous within any given area, thus assuring a compact article of considerable strength. It is, of course, to be understood that the cords are not subjected to sufficient pressure in the calender to weaken their structure, especially since they are surrounded by the rubber or rubber composition which is continually being distorted under pressure of the calender rolls.

Figure 7:
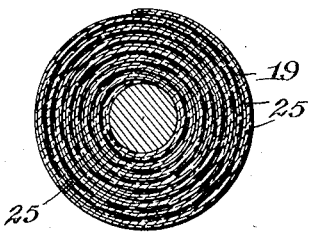
Fig. 7 is a cross section of said bearing in partly finished or rudimentary form, the same being constructed around a mandrel by winding or rolling the sheet material illustrated in Fig. 4 around said mandrel to the desired laminated form preparatory to vulcanizing or curing the same.

Decided advantages are derived from the flattening of these cords, as it will be apparent, upon rolling a sheet on a mandrel, as illustrated in Fig. 7, or otherwise building-up an object layer upon layer, that a considerably greater number of cords will be provided in any given area of the object than if the sheet were thicker and the cords left in their normal cross-sectional formation; all of which tends to greatly strengthen the product, whatever its cross-sectional formation may be.

Figure 4:
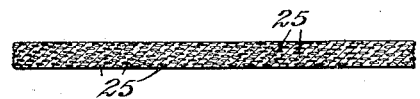
Fig. 4 is a cross section similar to Fig. 3, but illustrating the material after further manipulation according to my improved method.
Figure 8:
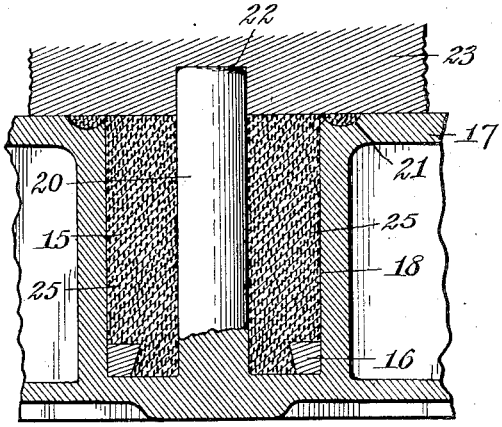
Fig. 8 is a sectional view of a vulcanizing or curing mold in which the rudimentarily formed object shown in Fig. 7 is firmly pressed and vulcanized or cured.

It is apparent from the foregoing, that objects of various kinds are built up according to this invention from layers of cord-embedded rubber, such as illustrated in Fig. 4, and when built up to approximate or what may be termed rudimentary form, are placed in a pressure-actuated vulcanizing or curing mold or apparatus to cure the same to desired completed form and size, as illustrated for example in Fig. 8, wherein the rudimentary object illustrated in Fig. 7 is shown inserted into the vulcanizing or curing mold after being removed from the mandrel and cut to desired length, which cutting may be accomplished after the rolled sheet, or bushing stock as it may be termed, is removed from the mandrel.

Figure 5:
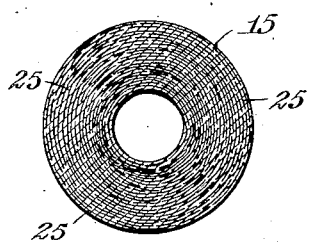
Fig. 5 is a cross section through a bushing or cushion bearing constructed according to my invention, such as is adaptable for use in pivotal connections.
Figure 6:
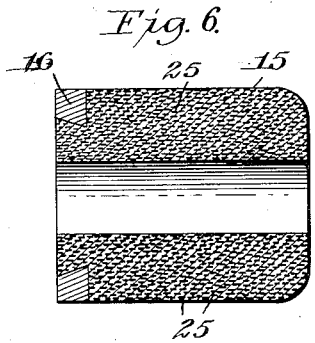
Fig. 6 is a longitudinal section of said bushing or cushion bearing.

In constructing an object such as shown in Figs. 5 and 6, which is used as a bushing for automobile shackles or other pivotal connectors, and which is designated by the numeral 15, a metallic or other supporting or retainer ring 16 is vulcanized thereto at one end, the ring having its axial opening undercut. This ring is placed within the curing mold 17 so as to rest on the bottom of the forming cavity 18 within said mold. The rudimentarily formed bushing, designated by the numeral 19, is then inserted into the forming cavity 18 and forced downwardly under high pressure so that it is fully entered in said cavity and the central region at its lower end forced into the undercut opening of the ring 16. This high pressure is utilized to consolidate or compress the rudimentarily formed object 19 around the pin 20 extending upwardly axially from the bottom of the forming cavity 18 and within said cavity so as to completely fill all space within the cavity; any surplusage of material being directed into the cut-off ring or groove 21 formed in the mold.

By reason of the fact that the rubber is pressed into the undercut opening of the ring, the latter is firmly united with the rubber body of the object.

The pin 20 also enters a socket 22 in the upper portion 23 of the curing mold as said upper portion descends and closely approaches the lower portion. When the upper portion of the mold is in its lowermost position, preferably in contact with the upper face of the lower portion, steam is introduced into the mold, which is hollow for the purpose, as shown, and the object so confined is cured for a period of fifteen to twenty minutes, or as may otherwise be found desirable or necessary.

Figure 9:
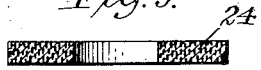
Fig. 9 is a cross section through a packing washer constructed in accordance with this invention.
Figure 10:
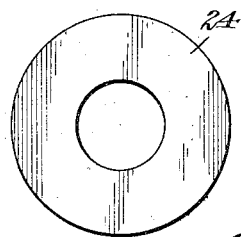
Fig. 10 is a plan view of the same.

To illustrate that this improved product may be utilized for various purposes, the gasket 24 shown in Figs. 9 and 10 is developed to its formative state and cured in the same manner as the bushing illustrated in Figs. 5 and 6, and it may here be stated that when winding or curling the calendered layer illustrated in Fig. 4 around a mandrel, it is so wound that the cords or shreds, designated 25 in each of the figures in the drawing, are disposed circularly within the object, as clearly shown in Figs. 5, 7, 8 and 9, such disposition of the cords or shreds within the body of the objects, especially circular objects, adds measurably to the strength of such objects and prevents uneven wear of the wall of the bore, and also of the exterior surface, for a greater length of time than rubber objects of like formation heretofore employed, as the cords so disposed within the body of the object prevent circular distortion of the rubber, and where such circular objects are employed in automobile shackles, or other oscillatable or pivotal connectors, assurance against such distortion is of the utmost value.

Where a lubricant is employed in the rubber composition, lubrication of shackles or other oscillatable or pivotal connectors is dispensed with. Furthermore, the rubber body is yielding under jars, or force, applied thereto of any kind, without tearing the cords from the rubber or otherwise causing segregation of said cords from the rubber, and due to the fact that these cords or shreds are thoroughly impregnated with the rubber or rubber composition and other constituent ingredients when made of textile material, they are hardly discernible when cutting an object in two, and they are practically exteriorly invisible.

Figure 11:
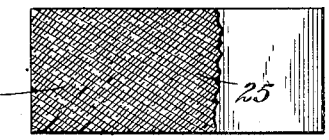
Fig. 11 is a sectional plan view of a rubber support, bumper, or other element, showing the retaining cords or shreds disposed diagonally, but all trending in the same general direction.
Figure 12:
Fig. 12 is a perspective view of a rubber element adapted for various uses and constructed of two sheets or layers, such as shown in Fig. 4, overlying each other and vulcanized into a unitary structure to provide an upper and a lower region with the cords or shreds in the upper region at an angle to those in the lower, the cords in each region trending in the same direction.

Since one of the features of my invention is the disposition of strain-resisting elements, preferably of short lengths of cords or shreds within the rubber body so that they trend in one direction, it will be apparent that some objects may have the cords or shreds disposed diagonally, as illustrated in Fig. 11, and in building up an object by lamination of the sheets prepared in the calender, as described, the laminations are converted into a homogeneous object when cured, and the cords or shreds in each region converted from a layer or sheet, trend in the same direction and may be parallel with those of an adjoining region, or substantially so, or they may cross each other at right angles, as shown in Fig. 12, or be otherwise disposed to change the direction in one region with respect to another, or others.

From the advantages set out with reference to the circular objects shown, the advantages of the cords, disposed as described in non-circular objects, will also be apparent, since they also guard against distortion of the rubber when in use and under pressure; at least such cords or other strain-resisting elements minimize the tendency of the rubber becoming distorted under pressure or other strains. For example in the particular construction of bushing illustrated in Figure 5 it will be understood that a pintle, shaft or other centering medium is inserted through the eye of the bushing and as radial strain is applied to the bushing by reason of its axial support sustaining a load or having strain otherwise applied thereto, the bushing which is enclosed within a housing, as is well understood, will be subjected to strain in a radial direction, and as the strain-resisting elements within the bushing are disposed circularly, the strain is applied at right angles, or practically so, to the strain-resisting elements. Consequently, said elements may be said to be arranged transversely to the strain or stress imposed when the product is in use. It may therefore be stated that the purposes of this invention are many and that the invention may be employed in the manufacture of washers, universal joints for automobiles and otherwise, bearings, packings of all kinds, automobile parts of all kinds, including connections of cross links, steering parts, motor supports, hood lacings, shackles, etc., and as the product is non-squeaking, its advantages for automobile parts and for use in many other places will be readily seen. It may also be used for railroad equipment of various kind, bumpers, bearings in industrial machines, and many other purposes. Where in the claims the term "rubber" is employed, it is intended to include any resilient material, such as synthetic rubber or other material having the qualities of rubber, or at least some of them, and where in the specification or claims the term "non-distortable" is employed, it is intended to means permanently non-distortable in view of the fact that under applied force distortion or change of form may take place, upon relief of which applied force the element or object will retrieve its normal position and form.

Having thus described my invention, what I claim is:

1. An article of manufacture, comprising a resilient body having short lengths of strain-resisting elements embedded therein, all such strain-resisting elements trending in one direction, and a retainer element of different material applied exteriorly to a part thereof and flush with the exterior of the article to prevent the outward bulging of the resilient material of the body of the article under applied pressure.

2. An article of manufacture having a body portion of resilient material in which short lengths of strain-resisting elements are evenly distributed throughout and vulcanized therein, all such strain-resisting elements trending in one direction, and a retainer element of different material applied to a part thereof and flush with the exterior of said body to prevent the bulging of the rubber outwardly under applied pressure.

3. A resilient product having short lengths of strain-resisting elements disposed therein and formed with the resilient material as a unitary object, the cords being comparatively thin and wide.

4. A resilient product having short lengths of cords disposed therein and formed with the resilient material as a unitary object, the cords being comparatively thin and wide and being approximately evenly distributed throughout the product and some overlapping others lengthwise.

5. A rubber product having cords therein arranged in different regions, the cords of one region trending in one direction and those in the other in a different direction.

6. A rubber product formed of rubber sheet laminations, each lamination having cords therein trending in one direction, the laminations being vulcanized to form a unitary structure and provide cords in one region of the unitary structure trending in a given direction and cords in another or other regions trending in a different direction or directions.

7. A resilient product of circular formation in cross section having short lengths of cords disposed therein, the cords being comparatively thin and wide and circularly disposed and some overlapping others lengthwise.

8. A resilient product of circular formation in cross section having thin and wide cords disposed therein arranged circularly in closely-spaced relation and irregularly with respect to their disposition lengthwise.

9. The method of producing a resilient product, which consists in mixing short lengths of cords with resilient material and in converting the resilient material into a flat object to cause the cords to assume positions within the resilient material trending in one direction, and in then subjecting said flat object to greater pressure to reduce the thickness of the same and to break down the cords into comparatively thin, wide strands.

10. The method of producing a resilient product, which consists in mixing short lengths of cords with resilient material and in converting the resilient material into a flat object to cause the cords to assume positions within the resilient material trending in one direction, in then subjecting said flat object to greater pressure to reduce the thickness of the same and to break down the cords into comparatively thin, wide strands, in building up said reduced object layer upon layer to the rudimentary form of the product desired, and in then curing the same.

11. The method of producing a rubber product, which consists in mixing short lengths of cords with rubber, in converting the rubber into a flat object to cause the cords to assume positions within the rubber trending in one direction, in then subjecting said flat object to greater pressure to reduce the thickness of the same and to break down the cords into comparatively thin and wide strands, in building up said reduced object layer upon layer in circular formation so that the cords trend circularly within the layers, and in then placing the so formed object into a curing mold and subjecting the same to a suitable curing temperature.

12. The method of producing a circular rubber product having a retainer ring encircling and molded thereto at one end thereof, which consists in subjecting a mass of rubber having short lengths of cords irregularly disposed in at least part thereof to crushing and rolling pressure to thoroughly mix the rubber and convert the same into a sheet and to cause the cords to assume positions trending in the same general direction, in then subjecting the rubber sheet to similar but greater pressure to reduce the thickness of the sheet and to crush the cords to reduce their thickness and widen the same, in then winding the sheet so formed layer upon layer in circular formation with the cords circularly disposed within the layers, in cutting the so wound sheets into desired lengths, in placing a retainer ring of different material into a curing mold, and in then inserting a prepared length of the circularly-wound rubber into the curing mold and applying pressure to the rubber so as to force portions thereof into said retainer ring, and in finally subjecting the mold to a temperature suitable for curing and to vulcanize the retainer ring to the rubber.

13. The method of producing rubber products, which consists in employing short lengths of used cords removed from tires or other commodities with the surrounding and saturated rubber thereof formed into a mass wherein said cords are irregularly disposed in short lengths, in passing such cord-embedded mass through a mill with the addition of rubber to cause thorough mixing of the rubber with said mass, to reduce the whole to a sheet and to cause the cords to trend in the same general direction, in then building up the product to form by arranging the sheet layer upon layer, in then molding the so-formed object to substantially finished form, and in next subjecting the object to desired curing temperature.

14. The method of producing rubber products, which consists in employing short lengths of used cords removed from tires or other commodities with the surrounding and saturated rubber thereof formed into a mass wherein said cords are irregularly disposed, in subjecting such mass to rolling pressure by passing it through a mill with the addition of rubber in quantities equal to said mass and simultaneously adding thereto a hardening material, an accelerator and a lubricant, in continuing the passing of the material so mixed through said mill to convert the same into a sheet and to cause the short lengths of cords to trend in the same general direction, in then subjecting the sheet to additional rolling pressure to reduce the thickness of the same and to break down the cords into comparatively thin and wide strands, in then building the material layer upon layer to the desired rudimentary form of the product to be completed, and in then placing the so rudimentary object into a mold and curing the same.

15. The method of producing rubber products, which consists in assembling short lengths of cords irregularly disposed and united by a yielding substance capable of being flattened under pressure, in subjecting the so assembled and united short lengths of cords and a quantity of rubber to rolling pressure and simultaneously therewith adding thereto a hardening substance so as to convert the entire mass into a flat sheet and cause the short lengths of cords to trend in the same general direction, in then subjecting the sheet so prepared to increased rolling pressure to diminish the thickness of the same and to reduce the cords by flattening and widening the same, also to cause cords not trending in the desired direction to so trend and to at least retain such trend if so disposed, in then fashioning the sheet to the rudimentary form of the desired product by building layer upon layer, and in then curing the so rudimentary formed object to desired finished form, or substantially so.

16. A rubber bushing for automobile shackles of circular formation in cross section having short lengths of flattened cords disposed therein arranged circularly in closely spaced relation, and a retainer ring of different material exteriorly applied to one end of said bushing with its outer peripheral face flush with the peripheral face of the rubber portion of said bushing so as to prevent bulging of the rubber outwardly under applied pressure.

17. An article of manufacture comprising a resilient body portion of circular formation in cross section having short lengths of cord disposed therein arranged circularly in closely spaced relation and irregularly with respect to their disposition lengthwise, and a retainer ring applied exteriorly to one end thereof, said retainer ring being of different material than that of the resilient body portion and being flush with an end face and the peripheral face of said rubber portion so as to prevent distortion of the resilient material at the angle formed by said end and peripheral face of the resilient body portion.

18. A resilient bushing for automobile shackles adapted to be peripherally enclosed and to have a center support passed therethrough, said bushing having short lengths of comparatively thin and wide strain-resisting elements embedded therein and trending in a direction to transversely receive the strains applied thereto when said bushing is in use.

19. A resilient bushing for automobile shackles adapted to be peripherally enclosed and to receive a center support, said bushing having short lengths of comparatively thin and wide strain-resisting elements evenly distributed throughout its body and all vulcanized therein and trending circularly to radially receive strains imposed on said bushing by said center support.

20. An article of manufacture adapted to have strain applied thereto in a given direction, comprising resilient material and comparatively thin and wide strain-resisting elements embedded in said material to transversely receive the imposed stress applied to said article when in use.

21. An article of manufacture, comprising a resilient material with comparatively thin and wide strain-resisting elements embedded therein arranged to restrain the resilient material from distorting when under pressure.

22. An article of manufacture, comprising a resilient substance formed to desired shape with strain-resisting elements arranged therein to resist imposed strains by receiving said strains in a transverse direction.

23. An article of manufacture, comprising resilient material, strain-resisting elements embedded in said material, and a lubricant, the whole formed to desired shape and cured to the required hardness.

24. A non-distortable resilient article of manufacture formed of resilient material and comparatively thin and wide, strain-resisting elements arranged within said material to prevent distortion of the material when under pressure.

25. The method of producing a resilient article, which consists in mixing short lengths of cords with the resilient material forming said article and in applying sufficient pressure to the material so provided with the cords to reduce the material to a thin sheet and to flatten the cords under such pressure, in then building up sheet upon sheet so formed to approximate the finished form of the article desired, and in then vulcanizing the so built up article.

26. The method of producing a resilient article, which consists in mixing short lengths of strain-resisting elements changeable in cross section under pressure with the resilient material of the object and in converting the resilient material into a thin sheet to cause the strain-resisting elements to assume positions within the resilient material trending in one direction and cause the strain-resisting elements to be changed in form to comparatively thin and wide cross sectional formation with the wide faces thereof parallel with the surfaces of the sheet, in then utilizing the sheet or sheets so formed to build up the form of the desired object, and in then vulcanizing the so built up form.

27. The method of constructing resilient sheets adapted for producing resilient objects formed by laminations, which consists in mixing short lengths of strain-resisting elements capable of being changed in cross sectional formation under pressure with resilient material to form a mass of material in which said strain-resisting elements are promiscuously disposed, and in then converting the rubber mass into a flat sheet under sufficient pressure to cause the strain-resisting elements to assume positions within the material trending in one direction and also to cause said strain-resisting elements to be changed in cross sectional formation under pressure into comparatively thin and wide elements having their flat sides parallel with the upper and lower faces of the sheet.

28. An article of manufacture comprising a resilient product formed of laminations of resilient material, each lamina having short lengths of strain-resisting elements embedded therein and rendered comparatively thin and wide under pressure in forming the lamina; the article in finished form comprising a unitary object having a body with short lengths of comparatively thin and wide strain-resisting elements embedded therein.

29. A resilient article comprising a body portion formed of resilient material and cords disposed within said material and formed therewith as a unitary object, said cords being comparatively thin and wide and being so formed under pressure in preparing such material for the article.

ANDREW J. BORST, Jr.